US011632364B1

(12) United States Patent
Singh et al.

(10) Patent No.: US 11,632,364 B1
(45) Date of Patent: Apr. 18, 2023

(54) DYNAMIC PROVISIONING OF USER GROUPS WITHIN COMPUTER NETWORKS BASED ON USER ATTRIBUTES

(71) Applicant: Juniper Networks, Inc., Sunnyvale, CA (US)

(72) Inventors: Gurminder Singh, Union City, CA (US); Pei-Yu Yang, Saratoga, CA (US); Mamata Devabhaktuni, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 15 days.

(21) Appl. No.: 17/305,179

(22) Filed: Jul. 1, 2021

Related U.S. Application Data

(63) Continuation of application No. 16/235,647, filed on Dec. 28, 2018, now Pat. No. 11,070,540.

(51) Int. Cl.
*H04L 9/40* (2022.01)
*G06F 21/31* (2013.01)

(52) U.S. Cl.
CPC .......... *H04L 63/0815* (2013.01); *G06F 21/31* (2013.01); *H04L 63/104* (2013.01); *H04L 63/20* (2013.01)

(58) Field of Classification Search
CPC ... H04L 63/0815; H04L 63/104; H04L 63/20; G06F 21/31
See application file for complete search history.

(56) References Cited

U.S. PATENT DOCUMENTS

| 7,111,321 B1 * | 9/2006 | Watts, Jr. ................ G06F 21/34 709/224 |
| 8,321,921 B1 | 11/2012 | Ahmed et al. |
| 8,909,711 B1 * | 12/2014 | Staddon ................ G06Q 50/01 709/204 |
| 8,978,122 B1 | 3/2015 | Zolfonoon et al. |
| 9,397,990 B1 * | 7/2016 | Taly ....................... H04L 63/08 |
| 9,774,586 B1 | 9/2017 | Roche et al. |
| 10,044,723 B1 | 8/2018 | Fischer et al. |

(Continued)

OTHER PUBLICATIONS

Response to Office Action dated May 26, 2021 from U.S. Appl. No. 16/235,739, filed Aug. 25, 2021, 9 pp.

(Continued)

*Primary Examiner* — Aravind K Moorthy
(74) *Attorney, Agent, or Firm* — Shumaker & Sieffert, P.A.

(57) ABSTRACT

A controller may be used to create and process an assertion, in some cases, to implement single-sign on (SSO) in a computer network. In some examples, the controller includes processing circuitry coupled to a storage device. The processing circuitry is configured to create the assertion, where the assertion includes information indicative of a set of attributes and parse the assertion to determine the set of attributes. Additionally, the processing circuitry is configured to determine if each attribute of the set of attributes maps to a plurality of primary user groups stored in the storage device. Based on determining that an attribute of the set of attributes does not map to at least one primary user group of the plurality of primary user groups, the processing circuitry is configured to create a set of secondary user groups and a set of secondary user group names corresponding to the attribute.

20 Claims, 6 Drawing Sheets

(56) References Cited

U.S. PATENT DOCUMENTS

| | | | |
|---|---|---|---|
| 10,078,762 B1 | 9/2018 | Gu et al. | |
| 10,142,349 B1* | 11/2018 | Tomlin | H04L 63/101 |
| 10,380,369 B1 | 8/2019 | Noe et al. | |
| 10,382,202 B1* | 8/2019 | Ohsie | H04L 63/0807 |
| 10,666,657 B1 | 5/2020 | Threlkeld | |
| 11,012,495 B1* | 5/2021 | Vakalapudi | H04L 9/3263 |
| 11,070,540 B1 | 7/2021 | Singh et al. | |
| 2004/0064693 A1* | 4/2004 | Pabla | G06Q 30/02 713/168 |
| 2005/0044398 A1 | 2/2005 | Ballinger et al. | |
| 2005/0289348 A1 | 12/2005 | Joy et al. | |
| 2006/0069915 A1* | 3/2006 | Koeda | G06F 21/126 713/168 |
| 2006/0136309 A1* | 6/2006 | Horn | G06Q 30/0633 705/26.8 |
| 2006/0235850 A1* | 10/2006 | Hazelwood | H04L 61/4523 707/999.009 |
| 2007/0244899 A1 | 10/2007 | Faitelson et al. | |
| 2010/0082979 A1* | 4/2010 | Edwards | H04L 67/561 713/168 |
| 2010/0107213 A1* | 4/2010 | Ureche | G06F 21/6218 726/1 |
| 2011/0161423 A1 | 6/2011 | Pratt et al. | |
| 2011/0314520 A1 | 12/2011 | Olszewski et al. | |
| 2012/0311039 A1 | 12/2012 | Ogawa | |
| 2014/0047498 A1 | 2/2014 | Malegaonkar et al. | |
| 2014/0068732 A1 | 3/2014 | Hinton et al. | |
| 2014/0181939 A1 | 6/2014 | Bonnell | |
| 2014/0245389 A1 | 8/2014 | Oberheide et al. | |
| 2014/0267580 A1 | 9/2014 | Parent et al. | |
| 2014/0282849 A1 | 9/2014 | Collison et al. | |
| 2014/0359131 A1 | 12/2014 | Seed et al. | |
| 2015/0215747 A1* | 7/2015 | Kemmerer, Jr. | H04W 4/50 455/518 |
| 2015/0296016 A1 | 10/2015 | Bennett, Jr. et al. | |
| 2015/0317463 A1 | 11/2015 | Herunde et al. | |
| 2016/0021179 A1 | 1/2016 | James et al. | |
| 2016/0044507 A1 | 2/2016 | Agiwal et al. | |
| 2016/0188440 A1* | 6/2016 | Bates | G06F 11/3624 717/145 |
| 2017/0123613 A1 | 5/2017 | Sugiyama | |
| 2017/0171208 A1 | 6/2017 | Purushothaman et al. | |
| 2017/0192767 A1 | 7/2017 | Choudhari et al. | |
| 2017/0324694 A1 | 11/2017 | Islam | |
| 2017/0353483 A1 | 12/2017 | Weith et al. | |
| 2017/0359346 A1 | 12/2017 | Parab et al. | |
| 2018/0109688 A1 | 4/2018 | Uchibori et al. | |
| 2018/0176417 A1 | 6/2018 | Ando | |
| 2018/0211055 A1 | 7/2018 | Balijepalli et al. | |
| 2018/0268045 A1* | 9/2018 | Orman | H04L 63/101 |
| 2018/0302392 A1 | 10/2018 | Gordon et al. | |
| 2018/0332141 A1 | 11/2018 | Brown et al. | |
| 2018/0375831 A1 | 12/2018 | Kliger et al. | |
| 2019/0005592 A1* | 1/2019 | Schlesinger | G06F 16/437 |
| 2019/0007415 A1 | 1/2019 | Kliger et al. | |
| 2019/0052644 A1 | 2/2019 | Shelton et al. | |
| 2019/0058734 A1 | 2/2019 | Xu et al. | |
| 2019/0073600 A1 | 3/2019 | Boshev et al. | |
| 2019/0104413 A1 | 4/2019 | Cidon et al. | |
| 2019/0109852 A1 | 4/2019 | Ranganathan et al. | |
| 2019/0114440 A1 | 4/2019 | Mani et al. | |
| 2019/0080698 A1 | 5/2019 | Miller | |
| 2019/0132299 A1 | 5/2019 | Tucker et al. | |
| 2019/0138658 A1* | 5/2019 | Mathur | G06F 16/9017 |
| 2019/0171842 A1 | 6/2019 | Ritter et al. | |
| 2019/0230127 A1 | 7/2019 | Gandham et al. | |
| 2019/0253430 A1 | 8/2019 | Gamache et al. | |
| 2019/0288839 A1 | 9/2019 | Lounsberry et al. | |
| 2019/0356697 A1 | 11/2019 | Chougule et al. | |
| 2019/0372845 A1* | 12/2019 | Tanaka | G06F 9/06 |
| 2019/0386960 A1 | 12/2019 | Huang et al. | |
| 2020/0004442 A1 | 1/2020 | Caswell et al. | |
| 2020/0014751 A1 | 1/2020 | Laursen et al. | |
| 2020/0026873 A1 | 1/2020 | Jain et al. | |
| 2020/0073770 A1 | 3/2020 | Mortimore, Jr. et al. | |
| 2020/0097310 A1 | 3/2020 | Shukla et al. | |
| 2020/0106766 A1 | 4/2020 | Suraparaju et al. | |
| 2020/0120083 A1 | 4/2020 | Kaladgi et al. | |
| 2020/0134656 A1 | 4/2020 | Padmanabhan | |
| 2020/0137042 A1 | 4/2020 | Kannan, III et al. | |
| 2020/0167446 A1 | 5/2020 | Azulay et al. | |
| 2020/0184045 A1 | 6/2020 | Mills et al. | |
| 2020/0192651 A1 | 6/2020 | Mudumbai et al. | |
| 2020/0204384 A1 | 6/2020 | Esbensen et al. | |

OTHER PUBLICATIONS

Advisory Action from U.S. Appl. No. 16/235,739, dated Feb. 16, 2022, 3 pp.

Final Office Action from U.S. Appl. No. 16/235,739, dated Dec. 1, 2021, 16 pp.

Response to Office Action dated Dec. 1, 2021, from U.S. Appl. No. 16/235,739, filed Jan. 18, 2022, 10 pp.

Singh et al., "Creating Roles and Controlling Access Within a Computer Network," U.S. Appl. No. 16/235,739, filed Dec. 28, 2018.

Singh et al., "Dynamic Provisioning of User Groups Within Computer Networks Based on User Attributes," U.S. Appl. No. 16/235,647, filed Dec. 28, 2018.

Prosecution History from U.S. Appl. No. 16/235,647, dated Dec. 4, 2020 through Mar. 30, 2021, 55 pp.

Office Action from U.S. Appl. No. 16/235,739, dated May 26, 2021, 13 pp.

Notice of Allowance from U.S. Appl. No. 16/235,739 dated Jul. 27, 2022, 10 pp.

Office Action from U.S. Appl. No. 16/235,739, dated Mar. 29, 2022, 23 pp.

Response to Office Action dated Mar. 29, 2022 from U.S. Appl. No. 16/235,739, filed Jun. 29, 2022, 11 pp.

* cited by examiner

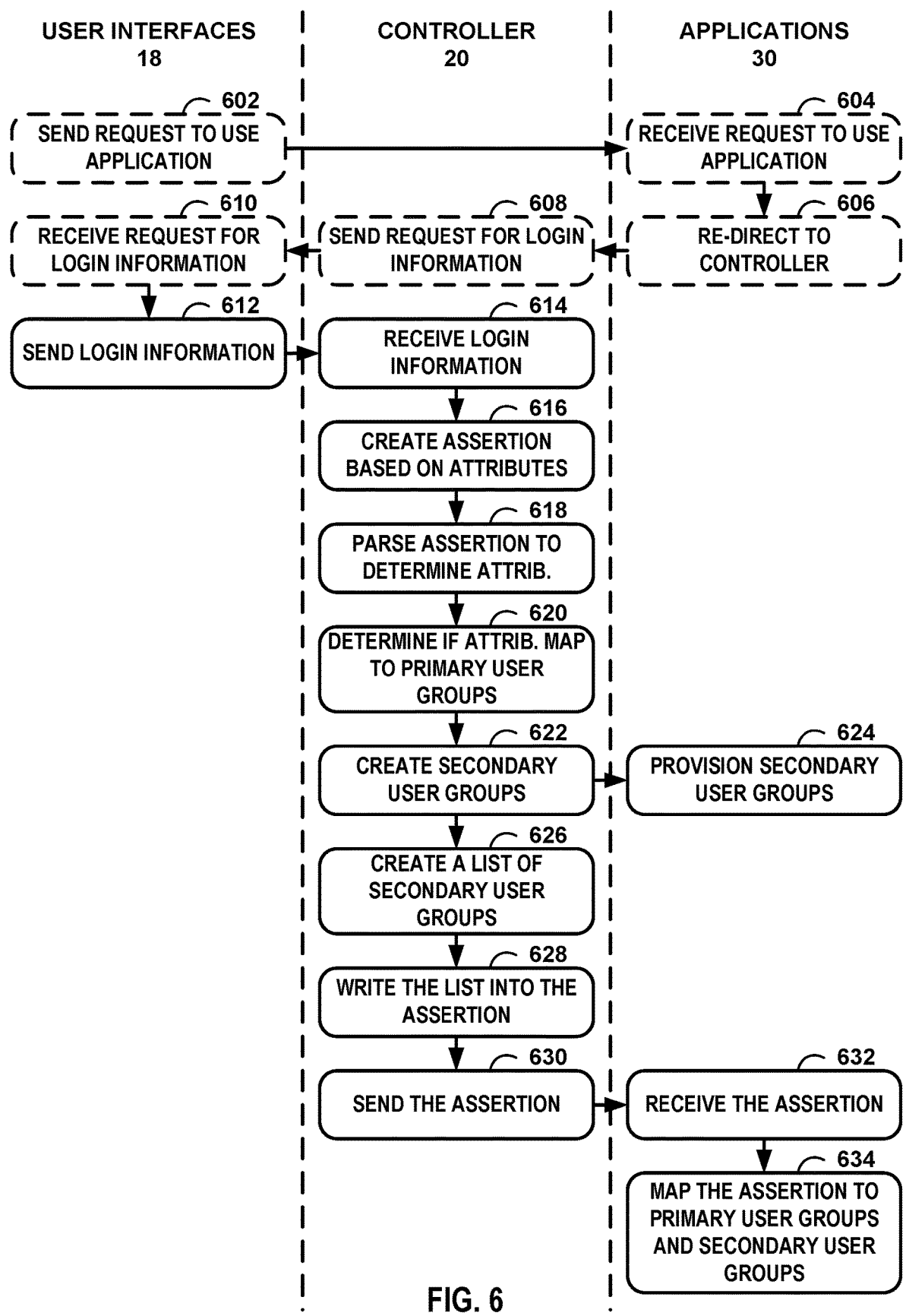

DYNAMIC PROVISIONING OF USER GROUPS WITHIN COMPUTER NETWORKS BASED ON USER ATTRIBUTES This application is a continuation of U.S. patent application Ser. No. 16/235,647, filed on Dec. 28, 2018, the entire content of which is incorporated herein by reference.

TECHNICAL FIELD

The invention relates to computer networks and, more specifically, to provisioning computer networks.

BACKGROUND

A computer network is a collection of interconnected computing devices that can exchange data and share resources. In a packet-based network, computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission. A computer network may have security policies which restrict a user's ability to perform actions within the computer network. In some examples, the computer network may require usernames and passwords to access the network, and the computer network may track and restrict access to some objects and services of the computer network based on the username or other login credentials of a user.

Keystone is a component of the OpenStack™ open-source software platform for cloud computing. In general, Keystone is open-source software that enables authentication (authN) and high-level authorization (authZ) within a computer network. More specifically, Keystone supports token-based authN and user-service authorization. Keystone may track a specific user's actions within the computer network, and Keystone may additionally restrict the user's actions based on a "role" or a group of roles that the user is assigned to. Additionally, a specific action or privilege of a user within the computer network may be referred to as a "capability."

Network service providers provide services such as linking customer sites through a network core (VPN services) or subscribers to a service, security, tunneling, virtual private networks, filtering, load-balancing, VoIP/Multimedia processing and various types of application proxies (HTTP, XML, WAP, etc.) to incoming packets. Service providers also provide content-specific services designed to improve the quality of a user's experience, for example, video streaming and caching. Service providers may administer a computer network, and one or more applications within the service provider network may use Keystone to control services available to users of a plurality of tenants which interact with the computer network. In some cases, each tenant of the plurality of tenants may include one or more users of the computer network.

A computer network may support multiple applications, which may represent or perform any service provided by a network. Single-sign on (SSO) procedures enable a user to gain access to more than one application after performing a single login process or interaction (e.g., entering a username and password, performing biometric signals, providing voice signals, or any combination thereof). For example, if a user is not yet authenticated and that user attempts to access a first application (i.e., a service provider), the first application may redirect the user to an SSO server (an identify provider). The user may provide login credentials to the identify provider through the SSO server, and the SSO server may authenticate the user based on the login credentials. To enable single-sign on, the SSO server may create an assertion written in extensible markup language (XML), the assertion including information corresponding to the user. The assertion, in some cases, may be a security assertion markup language (SAML) assertion. The SSO server may send the assertion to the service provider (i.e., the first application), enabling the user to access the first application. Additionally, if the user attempts to access a second application (a second service provider), the SSO server may send the assertion the second application, enabling the user to access the second application. In this way, the user may access more than one application supported by the computer network by performing a single login procedure.

SUMMARY

In general, this disclosure is directed to devices, systems, and techniques for enabling single-sign on (SSO) within a computer network that supports one or more applications. More specifically, this disclosure describes techniques for using a controller to create, modify, and/or pre-process an assertion that includes attributes associated with a user, such as a security assertion markup language (SAML) assertion, the assertion enabling the one or more applications supported by the computer network to authenticate the user based on the attributes. To authenticate the user, an application may use the Keystone identity service component within the OpenStack™ open-source software platform to determine if each attribute included in the assertion matches one or more user groups. Such user groups (or "primary" user groups) may, in some cases, represent user groups that are currently provisioned or that have been previously-provisioned in the computer network. In this way, the controller is configured to determine if user groups already exist such that the attributes may be successfully and efficiently mapped to previously-existing (or "primary") user groups by the applications using Keystone. Additionally, the controller is configured to determine if additional user groups, or "secondary" user groups, may be created and provisioned so that the applications supported by the computer network can map the attributes user groups more efficiently.

Tenants and roles may be examples of the "attributes" which are written (or "injected") into the assertion and represent information corresponding to the user. In some examples, tenants represent customers of the computer network and each tenant may have one or more users. A service provider administering the computer network may associate users with different combinations of roles such that role-based access control (RBAC) is implemented to control each user's access and privileges within the computer network. For example, a service provider administering the computer network may use RBAC to provide a subscription-based program having different levels of service offered. In some examples, the service provider may assign a set of roles that allow user access to services of the computer network according to on a fee-based subscription. For example, the service provider may assign a first user a first set of roles and a second user a second set of roles. The second set of roles may, in some cases provide the second user greater access to the computer network than the first set of roles role provides the first user if the second user subscribes to a higher level of service than the first user. Applications supported by the computer network may also control access based on attributes corresponding to the users.

In some examples, user groups facilitate the organization of users within the computer network based on a plurality of tenants and a plurality of roles. For example, an application supported by the computer network may determine whether a user may access the application based on whether attributes associated with the user map to certain user groups. In some examples, a controller may create an assertion, such as a SAML assertion, which includes the attributes associated with the user. The controller may match a user to one or more user groups based on tenants and roles associated with the user. Each user group may, for example, be associated with a unique combination of a tenant and a role. As such, a total number of user groups provisioned within the computer network may be equal to a total number of roles (M) of the plurality of roles times a total number of tenants (N) of the plurality of tenants. In some examples, the total number of tenants N of the computer network may be greater than 1000. Additionally, it can be noted that composition of roles and tenants within the computer network may dynamically change over a period of time. For example, tenants may be added and subtracted from the computer network, and the computer network may create custom roles to help implement RBAC. In this manner, if a new tenant is added to the computer network, the controller may need to provision a total of M user groups so that the new tenant is provisioned to account for each possible combination of the new tenant and the existing roles. Similarly, if a new role (e.g., a custom role) is added to the computer network, the controller may need to provision a total of N user groups so that the new role is provisioned to account for each possible combination of the new role and the existing tenants.

When an application supported by the computer network receives a request to access the application from a user, the application may determine whether the user is authenticated. If the user is not authenticated, the application may request the controller, which may serve as the identity provider in an SSO environment, to authenticate the user. In some cases, the controller may output request a request for login information to a user interface. The user interface may detect input in the form of login information and forward the login information over the network back to the controller. Subsequently, the controller may receive the login information and authenticate the user. The user input includes, in some cases, a username and a password. Additionally, in some cases, the user inputs input includes any combination of biometric information and audio information. In some examples, the controller represents an SSO server configured to create an assertion enabling more than one application to authenticate the user after the controller handles a single login procedure. For example, after receiving the login credentials, the controller may create an assertion including information indicative of attributes (e.g., tenants and roles) associated with the user. The controller may include a processing unit executed by processing circuitry. The processing unit may include a computer program, plug-in, or other module configured to process (or pre-process) the assertion prior to sending the assertion to the application.

The techniques of this disclosure may provide one or more advantages that facilitate mapping attributes to a large number of user groups, and that facilitate such mapping in an environment that uses a first-match rule processing process (e.g., as does the Keystone identify service). For example, by processing the assertion prior to sending the assertion to the application, the controller may improve the efficiency by which the application uses Keystone to map the attributes to the user groups. More specifically, the processing unit may parse the assertion to determine the attributes written in the assertion. Subsequently, the processing unit may cross-reference the attributes with existing user groups to determine if any of the attributes do not map to the existing attributes. For any non-matching attributes, the controller may provision new user groups (each associated with a tenant and a role) such that the non-matching attributes map to the new user groups. By dynamically provisioning the secondary user groups to account for an additional role (N+1) or an additional tenant (M+1) and pre-processing security assertions, the processing unit may improve the efficiency not only by which the application maps the attributes to user groups, eliminating a need for the application to statically provision user groups, but also may streamline the logic required to effectively process rules in Keystone's "first match" rules processing process. For example, the first match rules processing process may enable Keystone to match a user group names included in the assertion with user group names provisioned in the computer network.

In some examples, a service provider network acts as an identity provider, where the service provider network includes a controller administering access, by a plurality of tenants, to resources within the service provider network. The controller is configured to receive, from a service application, a request to authenticate a first user associated with a tenant, where the request to authenticate the first user includes a first set of attributes, process the request to authenticate the first user by identifying, based on the first set of attributes, a user group associated with the first user, and send first user authentication information to the service application, where the first user authentication information identifies the user group associated with the first user. The controller is further configured to receive, from the service application, a request to authenticate a second user, where the request to authenticate the second user includes a second set of attributes, process the request to authenticate the second user by determining, based on the second set of attributes, that a user group associated with the second user does not exist, create, based on the second set of attributes, the second user group, and send second user authentication information to the service application, where the second user authentication information identifies the user group associated with the second user.

In other examples, a controller includes processing circuitry coupled to a storage device. The processing circuitry is configured to create an assertion, where the assertion includes information indicative of a set of attributes, parse the assertion to determine the set of attributes, and determine if each attribute of the set of attributes maps to a plurality of primary user groups stored in the storage device. Based on determining that an attribute of the set of attributes does not map to at least one primary user group of the plurality of primary user groups, the controller is configured to create a set of secondary user groups and a set of secondary user group names corresponding to the attribute, wherein the set of secondary user groups are associated with the set of secondary user group names.

In other examples, a method includes creating, using processing circuitry of a controller, an assertion, where the assertion includes information indicative of a set of attributes, parsing, using the processing circuitry, the assertion to determine the set of attributes, and determining, using the processing circuitry, if each attribute of the set of attributes maps to a plurality of primary user groups stored in the storage device. Based on determining that an attribute of the set of attributes does not map to at least one primary user group of the plurality of primary user groups, the method further includes creating, using the processing circuitry, a set of secondary user groups and a set of secondary user group names corresponding to the attribute, wherein the set of secondary user groups are associated with the set of secondary user group names.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

FIG. 6 is a flow diagram illustrating an example operation in accordance with one or more techniques described herein.

Like reference characters denote like elements throughout the figures and text.

DETAILED DESCRIPTION

Figure 1:
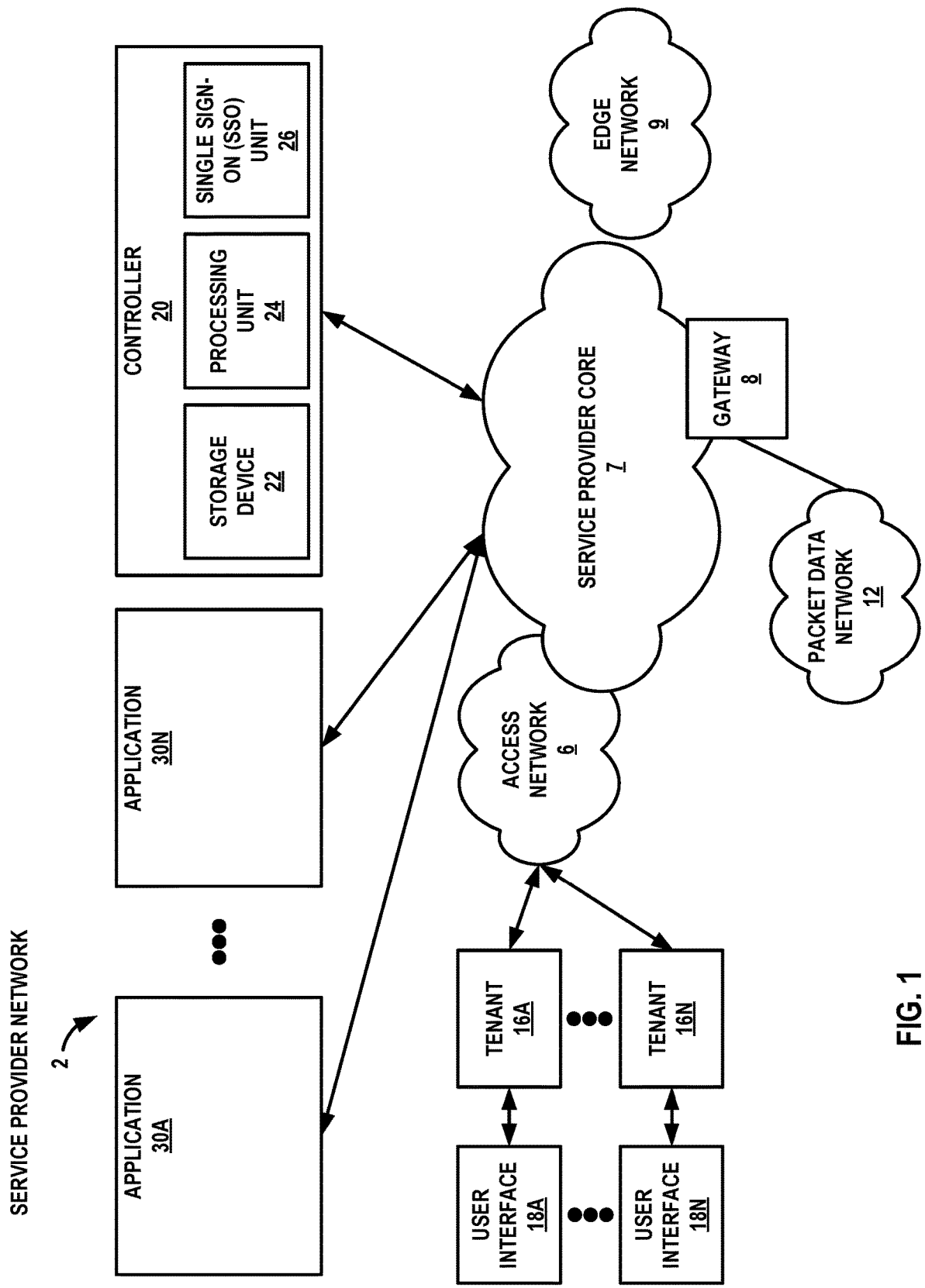
FIG. 1 illustrates an example network system, in accordance with one or more techniques described herein.

FIG. 1 illustrates an example network system in accordance with one or more techniques described herein. The example network system of FIG. 1 includes a service provider network 2 that provides packet-based network services to tenants 16A-16N (collectively, "tenants 16"). In this way, service provider network 2 provides packet-based network services to "users" of tenants 16. That is, service provider network 2 provides authentication and establishment of network access for users of tenants 16 such that the tenant may begin exchanging data packets with packet data network (PDN) 12, which may represent an internal or external packet-based network such as the Internet. Although described with respect to a service provider operating a service provider network 2, service provider network 2 may in some examples represent an enterprise network managed by a large enterprise. Thus, references to a "service provider" or "provider" may similarly refer to an "enterprise manager," "network manager," or "operator." In addition, although described primarily with respect to "tenants" that connote end-users of a service provider network services, the techniques described herein are similarly applicable to "customers" of the service provider and to customer devices such as cell towers, multi-tenant units (MTUs), residential aggregation points, and so forth. Examples of customers may include universities, businesses, or any other entities that purchase, lease, or otherwise use services provided by service provider network 2.

Role-based access control (RBAC) may, in some cases, be used as an approach to restrict and monitor user access within service provider network 2. For example, users of service provider network 2 may each be assigned at least one "role." Roles may be associated with "permissions" which allow users to perform actions, or view content, settings, materials, or other information. Permissions may, in some cases, be referred to a "capabilities." Tenants 16 may include entities that use, access, or exchange data with service provider network 2. Each tenant of tenants 16 may include one or more users. In turn, each user may represent, in some cases, a single device (e.g., mobile device, laptop, or tablet), and in other cases, a single user login account. Each user associated with tenants 16 may be assigned one or more roles. In some cases, single-sign on (SSO) authentication procedures may be implemented within service provider network 2 (e.g., to streamline a user's experience within service provider network 2). For example, service provider network 2 may authenticate a user after a single login procedure and create an assertion, such as a security assertion markup language (SAML) assertion, enabling service provider network 2 to grant that user access to one or more multiple computer systems without requiring the user to perform an additional user-drive login procedure. SSO may be compatible with RBAC procedures implemented within service provider network 2. For example, the assertion may include information indicative of roles and tenants associated with the user, enabling service provider network 2 to control a user's access based on the assertion.

The service provider administering service provider network 2 may use RBAC to restrict each user of tenants 16 to different levels of access within service provider network 2. Techniques of this disclosure may enable a service provider to customize the level of access available to each user by allowing a selection of custom combinations of roles to associate with each user. Each role may be associated with one or more capabilities, and each capability may represent a specific privilege (or set of privileges) or allowed action(s) within service provider network 2. If a user is assigned to a particular role, the user may operate within service provider network 2 according to the one or more capabilities that are associated with the respective role. In this way, assigning roles to users may enable the service provider to customize information that each user can view and/or interact with on respective user interfaces, such as user interfaces 18A-18N (collectively, "user interfaces 18").

Each of user interfaces 18 be a device or set of devices for interacting with and/or managing interactions, input, and/or output with one or more users. Accordingly, user interface 18 may include any now-known or hereinafter developed device for such interactions (e.g., keyboard, pointing device, microphone(s), touchscreen device(s), buttons, keypads, lights, microphone(s) and/or audio speaker(s) for voice commands, responses, and/or other interactions, display device(s), touchscreen device(s), or any combination thereof. If included within the user interface 18, a display may include any combination of a liquid crystal display (LCD), light-emitting diodes (LEDs), or organic light-emitting diodes (OLEDs). In some examples the display may include a touch screen or other physical or direct interaction device. Each of user interfaces 18 may correspond to (i.e., be accessible to or operated by) a user or a tenant of tenants 16. For example, user interface 18A may correspond to tenant 16A, user interface 18B may correspond to tenant 16B, and user interface 18N may correspond to tenant 16N. User interfaces 18 may be configured to display or present any information related to roles, capabilities, tenants 16, or other information. User interfaces 18 may, in some cases, receive user input. The user input may be, for example, in the form of pressing a button on a keypad or selecting an icon from a touch screen. In some examples, user input to user interface 18A may include login credentials of a user associated with tenant 16A. Based on the login credentials, service provider network 2 may authenticate the user and generate an assertion indicating the user's authentication status and attributes associated with the user. The attributes, in some cases, may include information about tenants and/or roles associated with the user.

In some examples, a computer program may contain objects designed to interact with one another. In this way, the services provided by service provider network 2 may include a plurality of objects, where at least some objects are configured with an API enabling interactions with other objects of the plurality of objects. Some of the objects of service provider network 2 may include representational state transfer (REST) application programming interfaces (APIs) that are RBAC controlled. As such, access to objects within service provider network 2 may be RBAC controlled. REST APIs may determine a user's access within service provider network 2. In some examples, RBAC may cause a navigation screen to be shown or to be hidden for a user based on capabilities that are associated with the user. In some examples, the REST APIs may be RBAC controlled such that a user has read-only access to a screen, but the user is not permitted to create an/or modify objects presented on the screen. In some examples, since a user interface layout may change over time or the REST APIs needed to display or present a user interface screen may change, a dynamic mapping of user interface capabilities to REST APIs may be beneficial.

In some examples, service provider network 2 may include a network that serves a business. At least some of tenants 16 may represent business units within the business, each business unit having a one or more employees. Each employee, in some cases, may represent a user. If a junior accounting employee of an accounting business unit logs in to a respective tenant associated with the accounting business unit (e.g., tenant 16A), the junior accounting employee may access service provider network 2 according to rules, privileges, and restrictions associated with the junior accounting employee. The rules, privileges, and restrictions may be manifested in custom roles created by the service provider which operates service provider network 2. For example, the junior accounting employee may be able to access privileged financial documents that are restricted for viewing and editing the junior accounting employee. In some cases, a senior accounting employee associated with tenant 16A may be assigned to different roles and capabilities than the junior accounting employee, affording the senior accounting employee privileges that the junior accounting employee is not granted. Moreover, if a design employee of a product development business unit logs in to a respective tenant associated with the product development business unit (e.g., tenant 16B), the design employee may be able to access documents including confidential design diagrams of a not-yet-released product. The junior accounting employee and the senior accounting employee might not have access to the design diagrams, for example.

In other examples, service provider network 2 may be managed by a service provider which offers a subscription-based program to customers. In such examples, users of tenants 16 may be customers of service provider network 2. The service provider may define custom roles that allow access to services of the computer network based on capabilities contracted for by such a customer (e.g., based on a user's agreement to pay the service provider in for subscribed services). For example, the service provider may assign a first user a first custom role and a second user a second custom role. The second custom role may, in some cases provide the second user greater access to service provider network 2 than the first custom role provides the first user if the second user subscribes to a higher level of service than the first user. Alternatively, or in addition, the second custom role may, in some cases provide the second user with otherwise different access to or capabilities of service provider network 2 than the first custom role provides the first user if the second user subscribes to a different level of service than the first user.

In the example of FIG. 1, service provider network 2 includes access network 6 ("access network 6") that provides connectivity to PDN 12 and edge network 9 via service provider core network 7 and gateway 8. Service provider core network 7 and PDN 12 provide packet-based services that are available for request and use by tenants 16. As examples, core network 7 and/or PDN 12 may provide, for example, bulk data delivery, voice over Internet protocol (VoIP), Internet Protocol television (IPTV), Short Messaging Service (SMS), Wireless Application Protocol (WAP) service, customer-specific application services, or any other now-known or hereafter developed network-based service. PDN 12 may include, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Tenants 16 connect to gateway 8 via access network 6 to receive connectivity to subscriber services for applications hosted by tenants 16. In this way, access network 6 may include a tenant portal to service provider network 2 which allows tenants 16 to exchange information with service provider network 2. A user of tenants 16 may be a subscriber who represents, for instance, an enterprise, a residential subscriber, or a mobile subscriber. Tenants 16 connect to access network 6 via access links that include wired and/or wireless communication links. The term "communication link," as used herein, includes any form of transport medium, wired or wireless, and can include intermediate nodes such as network devices. Each of access links may include, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between tenants 16 and gateway 8. Access network 6 represents a network that aggregates data traffic from one or more subscribers for transport to/from service provider core network 7 of the service provider. Access network 6 may include multiple "access" segments coupled to an aggregation segment and/or backhaul network owned or leased by the service provider. An access node of an access network couples to the customer premises equipment (CPE)

to process subscriber packets at layer 2 (L2) or higher. Access nodes may include digital subscriber line access multiplexors (DSLAMs), MTUs, passive optical network (PON) optical line termination devices such as Reconfigurable Optical Add-Drop Multiplexer (ROADM) with microelectromechanical systems (MEMS) and Liquid Crystal on Silicon (LCoS), cell site gateways (CSGs), eNode Bs, LTE/GSM/UMTS controllers, and microwave as well as virtual Multiple-Input and Multiple-Output (MIMO) over distributed base stations. In the cable operator (Multiple System Operator (MSO)) domain, the Data Over Cable Service Interface Specification (DOCSIS) 3.x standards specify a means of channel bonding and dynamic frequency allocation. Broadband cable access network nodes may include Cable Modem Termination Systems (CMTS) and Cable Modems, e.g., as part of a Converged Cable Access Platform (CCAP) solution.

Access network 6 includes network nodes that execute communication protocols to transport control and user data to facilitate communication between tenants 16 and gateway 8. Access network 6 may include a broadband access network, network, a wireless LAN, a public switched telephone network (PSTN), or other type of access network, and may include or otherwise provide connectivity for cellular access networks, such as radio access network (RAN) 4 of FIG. 1. Examples of access network 6 may also include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

Transport nodes of the access network connect access nodes to border nodes that enable inter-region packet transport. Border nodes may include area border routers and autonomous system boundary routers (ASBRs). In the illustrated example, border nodes (not shown) couple access network 6 to core network 7.

Service provider core network 7 (hereinafter, "core network 7") offers packet-based connectivity to tenants 16 attached to access network 6 for accessing PDN 12. Core network 7 may represent a public network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. PDN 12 may represent an edge network coupled to core network 7, e.g., by a customer edge device such as customer edge switch or router. PDN 12 may include a data center.

Access network 6, core network 7, and edge network 9 may include service nodes that apply services to subscriber packets. Service node examples include L2 provider edge (PE) or L3 PE routers, broadband network gateway (BNGs), peering routers, content servers, media gateways, base station controllers, and so forth. Illustrated gateway 8 includes an example of a service node.

In examples of service provider network 2 that include a wireline/broadband access network, gateway 8 may represent a Broadband Network Gateway (BNG), a Broadband Remote Access Server (BRAS), MPLS Provider Edge (PE) router, core router, L2/L3 PE router, or gateway, for instance. In examples of service provider network 2 that include a cellular access network as access network 6, gateway 8 may represent a mobile gateway, for example, a Gateway General Packet Radio Service (GPRS) Serving Node (GGSN), an Access Gateway (aGW), a Packet Data Network (PDN), or a Packet Gateway (PGW). In other examples, the functionality described with respect to gateway 8 may be implemented in a switch, service card or other network element or component.

Service provider network 2 additionally includes, in the example illustrated in FIG. 1, edge network 9. In some examples, edge network 9 may represent, e.g., a business edge network, broadband subscriber management edge network, mobile edge network, customer site such as enterprise branch offices, or a combination thereof. In some examples, edge network 9 may offer service provider managed network-hosted Value Added Services (VAS) including application-aware, and subscriber-aware services and charging, for instance. Access network 6 of FIG. 1 is also an example of an edge network for service provider network 2. Edge network 9 may alternatively represent a data center/value-added services complex that offers services by a computing environment including, e.g., a scalable cluster of general computing devices, such as x86 processor-based servers. As another example, the computing environment may include a combination of general purpose computing devices and special purpose appliances. Service provider core network 7 may couple to multiple edge networks, such as any of the aforementioned examples of edge network 9.

As virtualized, individual network services provided by service nodes of the data center can scale through the allocation of virtualized memory, processor utilization, storage and network policies, as well as by adding additional load-balanced virtual machines. In one example, edge network 9 includes a data center that includes a set of interconnected, high-performance yet off-the-shelf packet-based routers and switches that implement industry standard protocols. In one example, edge network 9 includes a data center that includes off-the-shelf components that provide Internet Protocol (IP) over an Ethernet (IPoE) point-to-point connectivity.

A network service provider that administers at least parts of service provider network 2 typically offers services to subscribers associated with devices which access the service provider network. Services offered may include, for example, traditional Internet access, VoIP, video and multimedia services, security services, and linking customer sites through the core network 7 using one of a point-to-point Ethernet service, multipoint-to-multipoint Ethernet service, point-to-multipoint Ethernet service, full-mesh L3VPN, and hub-and-spoke L3VPN, for instance. As described above with respect to access network 6, core network 7 may support multiple types of access network infrastructures that connect to service provider network access gateways to provide access to the offered services.

Controller 20, in one example, may include processing circuitry (not illustrated in FIG. 1) that is configured to implement functionality and/or process instructions for execution within service provider network 2. Controller 20 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry. In some examples, controller 20 creates, generates, and/or forwards an assertion to another device, such as a device executing at least one of applications 30A-30N (collectively, "applications 30"). One or more of applications 30 consume and/or process the assertion to determine access rights and/or capabilities that are available to a user associated with the assertion.

Applications 30 may, in some cases, represent computing devices, virtualized computing devices, modules or programs executing on one or more computing devices, and/or other computing resources ("units") that provide services or control distribution of services within service provider network 2. For example, each of applications 30 may represent units that provide video streaming, shopping, banking, online gaming, or any combination thereof. Some of applications 30 may, in some cases, represent units accessible only to users associated with a single tenant or customer of service provider network 2. Additionally, in some cases, some of applications 30 may be accessible to any user of service provider network 2 that is associated with a role or set of roles. In general, applications 30 may provide utility to users of service provider network 2 and, in some cases, applications 30 may receive access requests from users. Each of applications 30 may be operated by one or more organizations. In some examples, the service provider administering service provider network 2 operates at least some of applications 30. Additionally, applications 30 may be operated by organizations other than the service provider of service provider network 2. Service provider network 2 may use SSO to control user access to applications 30. For example, controller 20 may act as a single-sign on server that handles login requests from users and creates assertions enabling applications 30 to verify that respective users have been authenticated and identify attributes associated with those respective users.

In the example illustrated in FIG. 1, controller 20 includes storage device 22, processing unit 24, and SSO unit 26. Storage device 22 may be configured to store information within controller 20 during operation. Storage device 22 may include a computer-readable storage medium or computer-readable storage device. In some examples, storage device 22 includes one or more of a short-term memory or a long-term memory. Storage device 22 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage device 22 is used to store program instructions for execution by controller 20. Storage device 22 may be used by software or applications running on controller 20 to temporarily store information during program execution.

SSO unit 26 may, in some examples, create an assertion after receiving login information from one or more of user interfaces 18. In some examples, a user interface, such as user interface 18A, may detect input that it determines corresponds to a request, by a user, to access an application, such as application 30A. User interface 18A may output, over access network 6 and core network 7, information about the request. Application 30A may detect the information about the request and process the information to determine whether the user is authenticated. To evaluate whether the user is authenticated, Application 30A may, pursuant to SSO procedures, send a request to controller 20 to request an assertion associated with the user. In some examples, if the user has not yet been authenticated by service provider network 2 or if there is no assertion associated with the user, the user might not be authenticated within service provider network 2. In some such examples, application 30A may redirect the user to controller 20, which in some cases, includes SSO unit 26 configured to authenticate the user. In this manner, controller 20 is configured to function as a single-sign on server.

To authenticate the user, Controller 20 may output over core network 7 a signal, and user interface 18A may detect the signal and determine that it includes information sufficient to present a user interface. User interface 18A may use the information to present a login screen requesting login information. Subsequently, user interface 18A may detect input corresponding to login information and transmit the login information to controller 20. Although user interface 18A may receive information sufficient to present a user interface in response to a re-direct from applications 30, in some cases, user interface 18A may receive such information without a re-direct from applications 30 (e.g., if controller 20 authenticates a user directly). In some examples, input detected by user interface 18A may be in any of a variety of forms, including any combination of a username and password, biometric information, or voice information. User interface 18A outputs, over access network 6 and core network 7, information about the input detected by user interface 18A. Controller 20 receives the information and determines that it corresponds to login information detected at user interface 18A. SSO unit 26 of controller 20 may authenticate or not authenticate the user based on the login information. If SSO unit 26 authenticates the user, SSO unit 26 may create an assertion corresponding to the user, the assertion including a set of attributes. Subsequently, in some examples, SSO unit 26 may post the assertion to processing unit 24 for processing or otherwise alert processing unit 24 that the assertion is ready for processing.

Processing unit 24 may process the assertion to evaluate the set of attributes included in the assertion. Additionally, processing unit 24 may cross-reference the set of attributes with a plurality of primary user groups, where the plurality of primary user groups are stored in storage device 22 (or elsewhere) as a part of a user group database. In this way, processing unit 24 may be configured to process the assertion to determine if the user is associated with any attributes that are not provisioned within service provider network 2. In such situations where a user attribute does not match the plurality of primary user groups, processing unit 24 may create a set of secondary user groups, where the user attribute maps to at least one of the set of secondary user groups. Processing unit 24 may, in some cases, represent one or more computer programs executed by the processing circuitry of controller 20. In some examples, processing unit 24 may execute one or more software or program modules that interact with, enhance, supplement, or perform tasks associated with authentication or related procedures provided by the Keystone open-source software program. In some examples, such software or program modules are implemented as a Keystone or other authentication service plug-in, and may be developed pursuant to an API for Keystone or a related or similar service.

In some examples, the assertion created by processing unit 24 is a SAML assertion which is written in human-readable and machine-readable text. Processing unit 24 may be configured to process, pre-process, and/or parse information about the login information to determine a set of attributes and/or additional attributes to inject into the SAML assertion. In some examples, the set of attributes includes a set of tenants and a set of roles. As such, the set of tenants and the set of roles may be written into the assertion, where the set of tenants and the set of roles may be gleaned by parsing the assertion. To parse the assertion, processing unit 24 may employ linguistic parsing techniques. In other words, processing unit 24 may take the data indicative of the set of attributes and build a data structure. The data structure may include at least one of a parse tree, an abstract syntax tree, a flowchart, or another visual representation. In this manner, the data structure may indicate the set of tenants and the set of roles written into the assertion, where the set of tenants and the set of roles correspond to the user. In some examples, the set of tenants indicated by the assertion includes a single tenant. In some examples, the set of tenants indicated by the assertion includes two or more tenants.

After processing unit 24 parses the assertion to determine the set of attributes, processing unit 24 may be configured to determine if each attribute within the set of attributes maps to one or more user groups. Data indicative of the user groups may be stored in storage device 22 as a part of a user group database. In some examples where the set of attributes includes a set of tenants and a set of roles, each user group may be associated with a tenant and a role. To determine if each attribute of the set of attributes maps to the user groups, processing unit 24 may be configured to identify if each tenant matches an already-existing tenant and identify if each role matches an already-existing role. As such, processing unit 24 is configured to determine if each attribute maps to an already-existing, or "primary" user group.

In some examples, processing unit 24 identifies one or more tenants indicated by the assertion, where the identified tenant(s) do not match any of the already-existing, or "primary" tenants. Additionally, in some examples, processing unit 24 identifies one or more roles indicated by the assertion, where the identified role(s) do not match any of the already-existing or "primary" roles. In such an example, the tenants not matching any of the already-existing tenants may be considered a set of "secondary" tenants and the roles not matching any of the already-existing roles may be considered a set of "secondary" roles, respectively. (In such an example, the already-existing tenants and roles may be considered "primary" tenants and "primary" roles.) Accordingly, as used herein, the adjectives "primary" and "secondary" are not intended to indicate an order or a preference between groups, but rather, may correspond to initially-created or previously-existing user groups ("primary" user groups), and new, or later-created user groups ("secondary" user groups), and are used merely to distinguish between groups.

Based on determining that an attribute of the set of attributes does not map to at least one primary user group of the plurality of primary user groups, processing unit 24 may be configured to create a set of new, or secondary user groups and a set of new, or secondary user group names corresponding to the attribute, where the set of secondary user groups are associated with the set of secondary user group names. For example, after determining the set of secondary tenants and the set of secondary roles, processing unit 24 may be configured to create secondary user groups associated with the secondary set of tenants and the secondary set of roles. Processing unit 24 may create a secondary user group corresponding to each unique combination of a secondary tenant and a primary role, create a secondary user group corresponding to each unique combination of a secondary tenant and a secondary role, and create a secondary user group corresponding to each unique combination of a secondary role and a primary tenant. Subsequently, processing unit 24 may assign a secondary user group name to each secondary user group.

Additionally, in some examples, processing unit 24 is configured to create a list including the set of secondary user groups and the set of secondary user group names. The list may indicate a secondary user group name of the set of secondary user group names corresponding to each secondary user group of the list of secondary user groups. After creating the list, processing unit 24 is configured to write the list into the assertion. In this manner, processing unit 24 may be configured to add data to the assertion, the data reflecting the set of secondary user groups and the set of secondary user group names, and the data further reflecting the primary roles, secondary roles, primary tenants and secondary tenants associated with each secondary user group of the plurality of secondary user groups. Controller 20 may subsequently send the assertion to applications 30. For example, if user interface 18A outputs a request to access application 30A, controller 20 may, pursuant to a SSO procedure, send an assertion to application 30A. Likewise, if user interface 18A outputs a request to access application 30B, controller 20 may send an assertion to application 30B. In each case, each of applications 30 may be configured to map the attributes of the respective assertion to respective primary user groups and secondary user groups.

Figure 2:
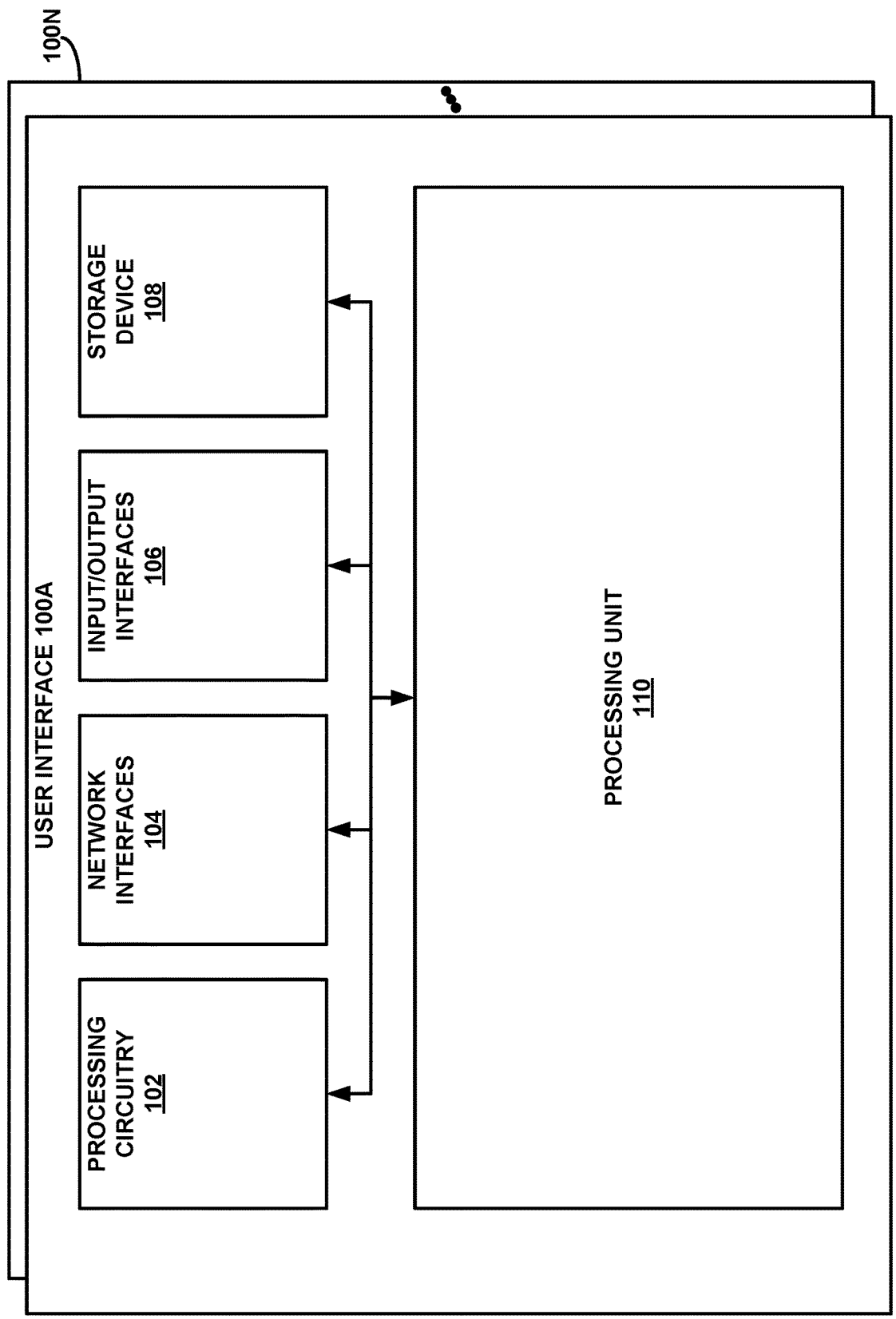
FIG. 2 is a block diagram illustrating example user interfaces, in accordance with one or more techniques described herein.

FIG. 2 is a block diagram illustrating example user interfaces 100A-100N (collectively, "user interfaces 100"), in accordance with one or more techniques described herein. User interfaces 100 of FIG. 2 may be described as an example or alternative implementation of user interfaces 18 within service provider network 2 of FIG. 1. For example, user interface 100A may be an example of user interface 18A of FIG. 1 and user interface 100N may be an example of user interface 18N. One or more aspects of user interfaces 100 of FIG. 2 may be described within the context of service provider network 2 of FIG. 1. The architecture of user interfaces 100 illustrated in FIG. 2 is shown as an example, user interfaces 100 should not interpreted as limited to the example architecture illustrated in FIG. 2. In other examples, user interfaces 100 may be configured in a variety of ways. User interfaces 100 may include processing circuitry 102, network interfaces 104, input/output interfaces 106, and storage device 108. In some examples, user interfaces 100 may be implemented through a computing device, such as a laptop computer, desktop computer, smartphone, or tablet.

Processing circuitry 102, in one example, may include one or more processors that are configured to implement functionality and/or process instructions for execution within user interfaces 100. For example, processing circuitry 102 may be capable of processing instructions stored by storage device 108. Processing circuitry 102 may include, for example, microprocessors, DSPs, ASICs, FPGAs, or equivalent discrete or integrated logic circuitry, or a combination of any of the foregoing devices or circuitry. Processing circuitry 102 may be included within user interface 100A, or apart from user interface 100A within another component (e.g., tenant 16A of FIG. 1). In any case, processing circuitry 102 may execute programs for operating, controlling, or managing user interfaces 100.

User interfaces 100 may utilize network interfaces 104 to communicate with external systems via one or more networks, e.g., service provider network 2 of FIG. 1. Network interfaces 104 may include Ethernet interfaces, optical transceivers, radio frequency (RF) transceivers, Wi-Fi, Bluetooth radios, telephony interfaces, or any combination thereof. In some examples, user interfaces 100 use network interfaces 104 to wirelessly communicate with external systems, e.g., controller 20 from FIG. 1. In some examples, network interfaces 104 may be a part of user interface 100A. Alternatively, in some examples, network interfaces 104 may be a part of another device, such as tenant 16A of FIG. 1.

Input/output interfaces 106 may include a button or keypad, lights, a speaker for voice input, portals for biometric data input (e.g., fingerprint scanners or retina scanners), a display, or any combination thereof. The display may include any combination of an LCD, LEDs, or OLEDs. An example display of input/output interfaces 106 may include a box for a user entry of a username and a box for a user entry of a password. Additionally, the example display may include a "Submit" or "Enter" button enabling input/output interfaces 106 to receive an input indicating that the user is ready to submit a username and a password for authentication. After user interface 100A receives the submission of login information indicative of the username and password, in some cases, user interface 100A may use processing unit 110 to encrypt the login information. Processing unit 11o may use a plurality of different encryption algorithms to encrypt the login information. Such algorithms may include Rivest-Shamir-Adleman (RSA), advanced encryption standard (AES), elliptic curve integrated encryption scheme (ECIES), data encryption standard (DES), twofish, threefish, or key exchange method, as examples. User interface 110 may send the encrypted login information to controller 20 via network interfaces 104 for authentication. If the user is authenticated, input/output interfaces 106 may display or present certain content from service provider network 2 that is available to the user. Another example display of input/output interfaces 106 may include a screen enabling the selection of one or more applications (e.g., applications 30 of FIG. 1) to be used via user interface 100A. For example, input/output interfaces 106 may receive a selection of an application, such as application 30A, where the selection is associated with a user. Subsequently, if the user is not already authenticated by controller 20, user interface 100A may receive a request to obtain login information from the user. The display of input/output interfaces 106 may output a prompt to obtain login information. Input/output interfaces 106 may include mechanisms to present information to a user (e.g., a display), in addition to collecting information from a user.

Storage device 108 may be configured to store information within user interfaces 100 during operation. Storage device 108 may include a computer-readable storage medium or computer-readable storage device. In some examples, storage device 108 includes one or more of a short-term memory or a long-term memory. Storage device 108 may include, for example, RAM, DRAM, SRAM, magnetic discs, optical discs, flash memories, or forms of EPROM or EEPROM. In some examples, storage device 108 is used to store program instructions for execution by processing circuitry 102. Storage device 108 may be used by software or applications running on user interfaces 100 (e.g., processing unit 110) to temporarily store information during program execution.

Figure 3:
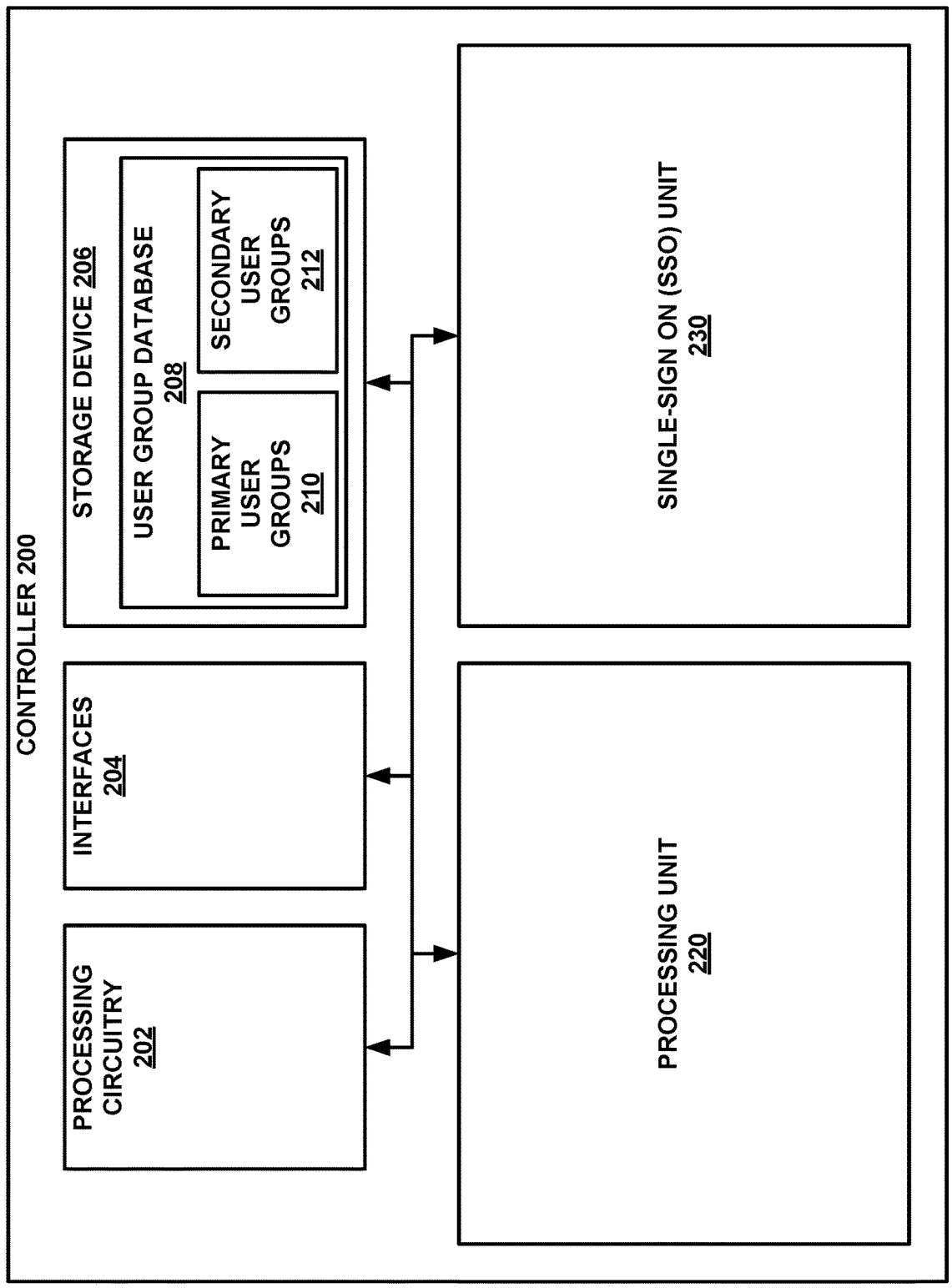
FIG. 3 is a block diagram illustrating an example controller, in accordance with one or more techniques described herein.

FIG. 3 is a block diagram illustrating an example controller 200, in accordance with one or more techniques described herein. Controller 200 of FIG. 3 may be described as an example or alternative implementation of controller 20 within service provider network 2 of FIG. 1. One or more aspects of controller 200 of FIG. 3 may be described within the context of service provider network 2 of FIG. 1. Controller 200 should not be interpreted as being limited to the example architecture illustrated in FIG. 3. In other examples, controller 200 may be configured in a variety of ways. In the example illustrated in FIG. 3, controller 200 includes processing circuitry 202, interfaces 204, storage device 206, processing unit 220, and SSO unit 230. Storage device 206 is configured to store primary user groups 210 and secondary user groups 212 in user group database 208. Storage device 206 of controller 200 may also store an operating system (not shown) executable by processing circuitry 202 to control the operation of components of controller 200. The components, units or modules of controller 200 are coupled (physically, communicatively, and/or operatively) using communication channels for inter-component communications. In some examples, the communication channels may include a system bus, a network connection, an inter-process communication data structure, or any other method for communicating data.

Controller 200 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, controller 200 represents a cloud computing system, server farm, and/or server cluster (or portion thereof) that provides services to client devices and other devices or systems. In other examples, controller 200 may represent or be implemented through one or more virtualized compute instances (e.g., virtual machines, containers) of a data center, cloud computing system, server farm, and/or server cluster.

Processing circuitry 202, in one example, may include one or more processors that are configured to implement functionality and/or process instructions for execution within controller 200. For example, processing circuitry 202 may be capable of processing instructions stored by storage device 206. Processing circuitry 202 may include, for example, microprocessors, DSPs, ASICs, FPGAs, or equivalent discrete or integrated logic circuitry, or a combination of any of the foregoing devices or circuitry. In some examples, processing circuitry 202 executes processing unit 220 and SSO unit 230.

Controller 200 may utilize interfaces 204 to communicate with external systems via one or more networks, e.g., service provider network 2 of FIG. 1. Interfaces 204 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, controller 200 utilizes interfaces 204 to wirelessly communicate with external systems, e.g., tenants 16, user interfaces 18, applications 30, and service provider core network 7 from FIG. 1.

Storage device 206 may be configured to store information within controller 200 during operation. Storage device 206 may include a computer-readable storage medium or computer-readable storage device. In some examples, storage device 206 includes one or more of a short-term memory or a long-term memory. Storage device 206 may include, for example, RAM, DRAM, SRAM, magnetic discs, optical discs, flash memories, or forms of EPROM or EEPROM. In some examples, storage device 206 is used to store program instructions for execution by processing circuitry 202. Storage device 206 may be used by software or applications running on controller 200 to temporarily store information during program execution.

Storage device 206 includes user group database 208. User group database 208 may store primary user groups 210 and secondary user groups 212. User groups, in some cases, may be used to organize users of service provider network 2 by associating users with tenants and roles. Since tenants (e.g., tenants 16) may include entities that use, access, or exchange data with service provider network 2 and each tenant of tenants 16 may include one or more users, user groups may enable controller 200 to match users with their respective tenants. Similarly, user groups may enable controller 200 to associate users with their respective roles. Roles, which may be an important component of RBAC, may in some cases be used to restrict and monitor user access within service provider network 2. For example, a role may be associated with a plurality of capabilities which enable a user assigned to the role to perform certain actions within service provider network 2. In some examples, every user associated with a tenant may be assigned to the same set of roles. However, in other examples, users assigned to a tenant may be assigned to different sets of roles.

A user group may, in some cases, represent a set of users that is associated with a tenant/role pair. For example, a first user group may represent a first set of users that is associated with both of a first tenant and a first role and a second user group may represent a second set of users that is associated with both of the first tenant and a second role. In fact, a user group may be associated with each unique pair tenant/role pair that is known to controller 200 (e.g., each unique pair of primary user groups 210 and secondary user groups 212). Some users may, in some cases, be a part of the first user group, the second user group, and other user groups besides. Other users might not belong to any of the user groups at all. Other users may belong to the first user group or the second user group, but not both.

Processing unit 220 may be, in some cases, a computer program that is configured to parse assertions, process assertions, modify assertions, output data from assertions, or any combination thereof. Processing unit 220 may, in some cases, function as a pre-processing module for creating an assertion and preparing the assertion to be further processed by applications 30 of FIG. 1. For example, after processing unit 220 pre-processes an assertion, applications 30 may use the Keystone component of the OpenStack™ open-source software platform to map attributes of the assertion to primary user groups and secondary user groups. Processing unit 220 may improve the efficiency by which applications 30 are configured to map the assertions to user groups. For example, processing unit 220 may create secondary user groups 212 based on the attributes of the assertion. Additionally, processing unit 220 may provision secondary user groups 212 in applications 30 such that applications 30 are able to map the attributes to user groups more efficiently or in a shorter amount of time than if processing unit 220 did not create or provision secondary user groups 212. Before processing unit 220 pre-processes an assertion, in some examples, SSO unit 230 creates the assertion.

In some examples, processing unit 230 creates an assertion after authenticating a user. A user authentication process may be initiated by any combination of user interfaces 18, controller 200, or applications 30. In some examples, an application, such as application 30A may transmit a request to SSO unit 230 to initiate an authentication process. The request to initiate the authentication process may be, in some cases, based on application 30A receiving a request from a user interface (e.g., user interface 18A) to access application 30A. To initiate the authentication process, controller 200 may send a request for login information to user interface 18A. User interface 18A may present information to a user and detect responsive input in the form of login information. User interface 18A may output information about the login information over the network to the controller 200. Subsequently, controller 200 may receive information about the login information which, in some cases, is encrypted. The login information may correspond to or identify a user associated with tenant 16A. SSO unit 230 may be configured to decrypt the login information and authenticate the user based on the login information. After authenticating the user, SSO unit 230 may create an assertion including a set of attributes associated with the user. In this manner, controller 200 may function as a single-sign on server. In some examples, to create the assertion, SSO unit 230 may look up one or more of the set of attributes in storage device 206. Additionally, or alternatively, user interface 18A may send information indicative of at least one user attribute to controller 200 for inclusion in the assertion. After creating the assertion, in some examples, SSO unit 230 may post the assertion to processing unit 220 for processing or otherwise alert processing unit 220 that the assertion is ready for processing.

After SSO unit 230 creates the assertion, processing unit 220 may, in some cases, parse the assertion to determine the set of attributes and determine relationships between different combinations of attributes of the set of attributes. In some examples, the set of attributes includes any combination of tenants and roles. For example, since the assertion corresponds to a user of tenant 16A, the assertion may include an attribute representative of tenant 16A. Processing unit 220 may determine if the attributes of the assertion match primary user groups 210, which are stored in storage device 206. Primary user groups 210, in some examples, are groups of users that are associated with both of a tenant and a role. More specifically, each of primary user groups 210 is associated with a unique pair of a primary tenant and a primary role. In this way, to determine the attributes map to primary user groups 210, processing unit 220 may identify if each tenant indicated by the assertion matches a primary tenant and identify if each role indicated by the assertion matches a primary role. Processing unit 220 may determine that tenants indicated by the assertion which do not match any of the primary tenants are secondary tenants. Similarly, processing unit 220 may determine that roles indicated by the assertion which do not match any of the primary roles are secondary roles.

After identifying the secondary tenants and the secondary roles, processing unit 220 may create a secondary user group corresponding to each unique combination of tenants and roles that includes a secondary tenant or a secondary role. Put another way, processing unit 220 may create secondary user groups 212 in storage device 206, where secondary user groups 212 include user groups for placing users associated with secondary tenants and secondary roles. For example, to create secondary user groups 212, processing unit 220 may create secondary user groups corresponding to each unique combination of a secondary tenant and a primary role, create a secondary user group corresponding to each unique combination of a secondary tenant and a secondary role, and create a secondary user group corresponding to each unique combination of a secondary role and a primary tenant. After creating secondary user groups 212, controller 200 may provision secondary user groups 212 in applications 30. In this way, processing unit 220 may create and provision secondary user groups 212 such that applications 30 may successfully map each attribute of the assertion to either a primary user group or a secondary user group. In addition to creating secondary user groups 212, processing unit 220 may assign a secondary user group name to each of secondary user groups 212.

Processing unit 220 may be further configured to create a list including secondary user groups 212 and the respective secondary user group names. Additionally, in some examples, processing unit 220 writes the list into the assertion. To write the list into the assertion, processing unit 220 may record the tenant/role pairs associated with each of secondary user groups 212. Subsequently, controller 200 may send the assertion to application 30A. By sending the assertion to application 30A, application 30A may use the Keystone component of the OpenStack™ open-source software platform to map the set of attributes to respective primary user groups 210 and secondary user groups 212. Controller 200 may be configured to save a copy of the assertion in storage device 206. In some examples, any one or more of applications 30 may request the assertion from controller 200 in order to verify that the user corresponding to the assertion has been authenticated by controller 200. In this way, user interfaces 18 might not need to separately request login information for each application of applications 30. Rather, controller 200 may authenticate the user using a single authentication process and thereafter create the assertion, the assertion enabling any combination of applications 30 to verify that the user has been authenticated and grant access to the user. In some examples, the assertion may expire after a period of time. The period of time may be any time value or range of time values, and the period of time may be set by an administrator of service provider network 2. After the assertion expires, controller 200 may re-authenticate the user and create another assertion for granting access to applications 30.

Figure 4:
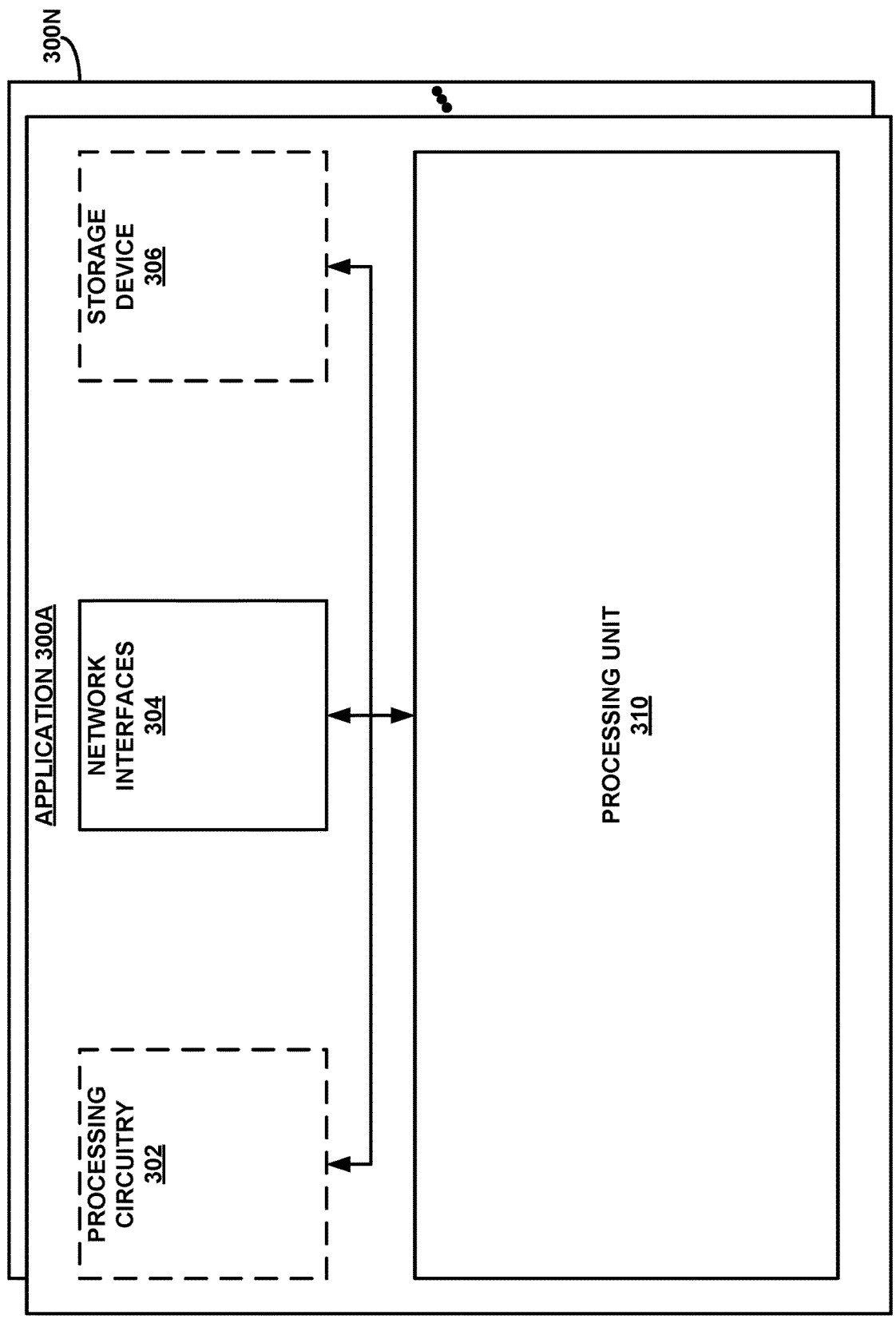
FIG. 4 is a block diagram illustrating example applications, in accordance with one or more techniques described herein.

FIG. 4 is a block diagram illustrating example applications 300A-300N (collectively, "applications 300"), in accordance with one or more techniques described herein. Applications 300 of FIG. 4 may be described as an example or alternative implementation of applications 30 within service provider network 2 of FIG. 1. For example, application 300A may be an example of application 30A of FIG. 1 and application 300N may be an example of application 30N. One or more aspects of applications 300 of FIG. 4 may be described within the context of service provider network 2 of FIG. 1. The architecture of applications 300 illustrated in FIG. 4 is shown as an example. Applications 300 should not be interpreted as being limited to the example architecture illustrated in FIG. 4. In other examples, applications 300 may be configured in a variety of ways. Application 300A, for example, may include processing circuitry 302, network interfaces 304, and storage device 306.

Processing circuitry 302, in one example, may include one or more processors that are configured to implement functionality and/or process instructions for execution within application 300A. For example, processing circuitry 302 may be capable of processing instructions stored by storage device 306. Processing circuitry 302 may include, for example, microprocessors, DSPs, ASICs, FPGAs, or equivalent discrete or integrated logic circuitry, or a combination of any of the foregoing devices or circuitry. Processing circuitry 302 may be placed in any location within service provider network 2, such as within a data center. Processing circuitry 302 may execute programs for operating, controlling, or managing applications 300.

Applications 300 may use network interfaces 304 to communicate with external systems via one or more networks, e.g., service provider network 2 of FIG. 1. Network interfaces 304 may include Ethernet interfaces, optical transceivers, radio frequency (RF) transceivers, Wi-Fi, Bluetooth radios, telephony interfaces, or any combination thereof. In some examples, application 304A uses network interfaces 304 to wirelessly communicate with external systems, e.g., service provider core 7, tenants 16, user interfaces 18, and controller 20 from FIG. 1.

Storage device 306 may be configured to store information during operation of application 300A. Storage device 306 may include a computer-readable storage medium or computer-readable storage device. In some examples, storage device 306 includes one or more of a short-term memory or a long-term memory. Storage device 306 may include, for example, RAM, DRAM, SRAM, magnetic discs, optical discs, flash memories, or forms of EPROM or EEPROM. In some examples, storage device 306 is used to store program instructions for execution by processing circuitry 302. Storage device 306 may be used temporarily store information during program execution of application 300A. Storage device 306 may be placed in any location within service provider network 2, such as within a data center.

Applications 300 may, in some examples, represent modules or programs executing on one or more physical or virtual computing devices that provide services or control distribution of services within service provider network 2, and may present any now-known or hereinafter developed network provided service (e.g., shopping, social networks, video streaming services, banking services, online games, or any combination thereof). Applications 300 may be provisioned within service provider network 2 and operated by any combination of the administrator of service provider network 2 or third-party application developers which subscribe to service provider network 2. Tenants 16 in some cases may subscribe to service provider network 2 at least in part to enable users of tenants 16 to gain access to applications 300. RBAC may be implemented by service provider network 2 or the operators of applications 300 to restrict access to applications 300. For example, access may be granted to each of applications 300 based any combination of tenants, roles, and capabilities associated with a respective user.

Application 300A may, in some cases, receive a signal from a user interface (e.g., user interface 18A) corresponding to a user request to access application 300A. Processing unit 310 of application 300A may determine whether the user has already been authenticated by controller 20 (see FIG. 1) by interacting with controller 20 over core network 7. If the user has not been authenticated by controller 20, user processing unit 310 may output over core network 7 a request to controller 20, instructing controller 20 to initiate an authentication process with user interface 18A. If controller 20 authenticates the user based on input detected by user interface 18A, user interface 300A may receive, from controller 20 over core network 7, an assertion, where the assertion includes information indicative of a set of attributes associated with the user. In some cases, primary user groups are provisioned in storage device 306 before Application 300A receives the request from user interface 18A. Additionally, in some cases, controller 20 may provision secondary user groups in storage unit 306. As such, processing unit 310 may be configured to map the set of attributes to any combination of the primary user groups and the secondary user groups. In some examples, application 300A may grant access only to users who fit into certain user groups. As such, by mapping the attributes of the assertion to the user groups, processing unit 310 may be configured to determine whether the user can be granted access to application 300A.

Any of applications 300 may output requests for the assertion to controller 20. In this way, each of applications 300 may determine whether the user has been authenticated by controller 20 and may also determine the roles afforded to the user. In this way, the assertion, as modified and/or processed by controller 20, enables efficient SSO operations within service provider network 2.

Figure 5:
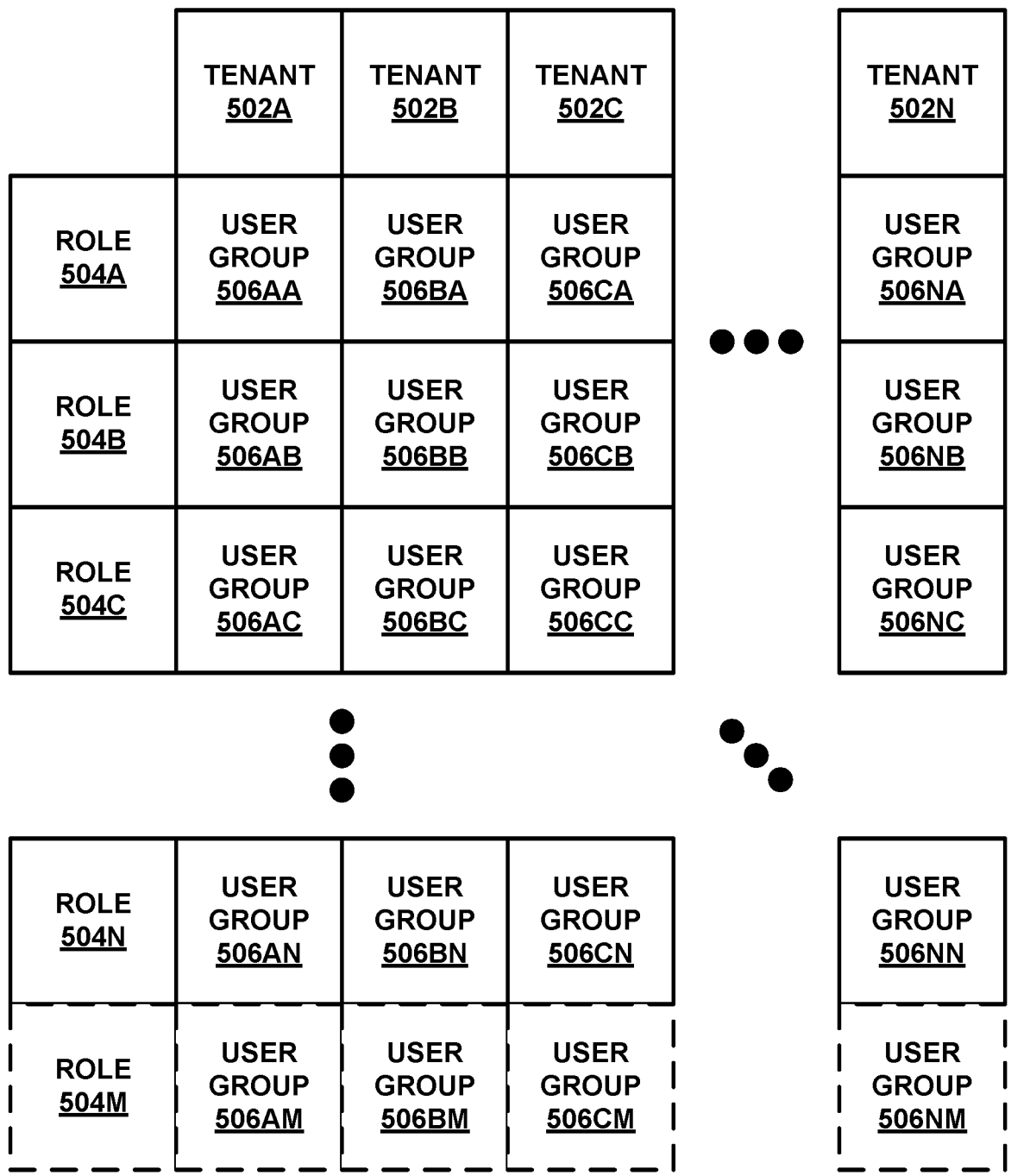
FIG. 5 is a block diagram representing an example organization of user groups, in accordance with one or more techniques described herein.

FIG. 5 is a block diagram representing an example organization of user groups, in accordance with one or more techniques described herein. Tenants 502A-502N (collectively, "tenants 502" and representing any number of tenants) may represent customers of service provider network 2 (illustrated in FIG. 1). Tenants 502 of FIG. 5 may be described as examples or alternative implementations of tenants 16 within service provider network 2 of FIG. 1. Each of tenants 502 may be associated with one or more users. For example, a tenant (e.g., tenant 502A) may represent a subscriber of service provider network 2. The subscriber may have employees, where each employee is a "user" of service provider network 2. To implement RBAC in service provider network 2, controller 20 may associate custom combinations of roles 504A-504M (collectively, "roles 504" and representing any number of roles) with each of tenants 502. Each role of roles 504 may be associated with one or more capabilities, each capability representing a privilege or an action which may be performed within service provider network 2 by a user which is assigned to a role associated with the respective capability. In this way, controller 20 is configured to control an amount or level of access that users of tenants 502 have within service provider network 2. Moreover, to achieve a finer granularity of access control, controller 20 may be configured to assign custom combinations of roles to each user of an individual tenant, such as tenant 502A.

User groups 506AA-506NM (collectively, "user groups 506") are used, in some examples, by controller 20 for organizing users authenticated by service provider network 2. For example, if user interfaces 18 receive a user input representing user login information corresponding to a user, user interfaces 18 may send the login information to controller 20 and controller 20 may authenticate the user. Subsequently, controller 20 may create an assertion including information indicative of a set of tenants that the user is associated with and a set of roles that are assigned to the user. Controller 20, by parsing the assertion including the information indicative of the tenants and the roles, may be configured to match the user to user groups 506. In one example, a user may be an employee of a corporate entity representing a customer of service provider network 2. The corporate entity may be tenant 502A. Additionally, the user may be assigned to roles 504B and 504C. In some cases, each user associated with tenant 502A is assigned to a custom set of roles 504. Controller 20 may be configured to match the user to user group 506AB and user group 506AC since user group 506AB and user group 506AC correspond to tenant 502A, role 504B, and role 504C.

In the example of FIG. 5, user groups 506AA-506NA, user groups 506AB-506NB, user groups 506AC-506NC, and user groups 506AN-506NN may be examples of primary user groups 210 stored in storage device 206 of FIG. 2. Primary user groups 210 may be created and provisioned in service provider network 2 before controller 20 processes an assertion. However, if controller 20 parses the assertion and is unable to match at least one attribute (e.g., tenant and role) indicated by the assertion to primary user groups 210, controller 20 may create and provision secondary user groups 212 in service provider network 2. For example, controller 20 may parse the assertion and match the attributes of the assertion to primary user groups 210. In some cases, controller 20 may determine that at least one of the attributes does not match any of primary user groups 210. In response to determining that at least one of the attributes does not match any of primary user groups 210, controller 20 may create secondary user groups 212 so that it is possible to match all of the attributes of the assertion to at least one user group. In one example, the assertion is associated with tenant 502B, role 504A, and role 504M. However, in some cases, none of primary user groups 210 might be provisioned such that role 504M can be matched to user groups 506. Controller 20 may create user groups 506AM-506NM, which may represent at least some of secondary user groups 212 of FIG. 2. Additionally, in some examples, controller 20 may provision user groups 506AM-506NM in applications 30. In this way, it is possible for controller 20 to map the user corresponding to the assertion to user group 506BA and 506BM.

FIG. 6 is a flow diagram illustrating an example operation in accordance with one or more techniques described herein. The example operation is described with respect to user interfaces 18, controller 20, and applications 30 of FIGS. 1-3, and components thereof. In the example operation of FIG. 6, a user interface of user interfaces 18, such as user interface 18A, is configured to send a request to use an application, such as application 30A (602), where the request is associated with a user. Application 30A may receive the request to use the application (604). In some examples, application 30A may determine whether the user is authenticated pursuant to SSO procedures. If the user is not authenticated, application 30A may re-direct the request to use the application to controller 20 (606). Subsequently, controller 20 sends a request for login information to user interface 18A (608). User interface 18A receives the request for login information (610) and sends login information to controller 20 (612). In some examples, step 612 may occur without being proceeded by steps 602-610. In some examples, user interface 18A sends the login information over a wireless communication link. In other examples, user interface 18A is electrically coupled to controller 20 and user interface 18A sends the assertion to controller 20 via electric circuitry. Controller 20 receives the login information (614) and creates an assertion based on a set of attributes associated with the user (616). In some examples, SSO unit 26 of controller 20 creates the assertion and subsequently posts the assertion to processing unit 24 for pre-processing.

After the assertion is created, controller 20 parses the assertion to determine the set of attributes (618). For example, to parse the assertion to determine the set of attributes, controller 20 may use linguistic parsing techniques to determine the set of tenants, the set of roles, and associations between the tenants and the roles. Each role may be associated with various capabilities that each represent privileges and actions that may be performed by a user associated with the respective capability. In this way, by parsing the assertion, controller 20 may determine an amount of network access afforded to the user associated with the assertion. In some examples, processing unit 24 of controller 20 parses the assertion.

Controller 20 determines if each attribute maps to a plurality of primary user groups (620). A data representation of the plurality of primary user groups may be, in some cases, stored in storage device 22 of controller 20. User groups may enable controller 20 to organize users based on attributes (e.g., tenants and roles) associated with the respective users and restrict access to service provider network 2 based on the user groups corresponding to each user. In this way, it may be beneficial for controller 20 to be able to determine if each attribute maps to the plurality of primary user groups so that controller 20 can provision additional user groups if needed. In some examples where the set of attributes includes a set of tenants and a set of roles, in order to determine if each attribute maps to the plurality of primary user groups, controller 20 is configured to identify if each tenant of the set of tenants matches a primary tenant of the plurality of primary tenants. Additionally, controller 20 may identify if each role of the set of roles matches a primary role of the plurality of primary roles. Primary user groups may be represented by users associated with each unique and valid combination of a primary tenant and a primary role. In this manner, if a tenant of the set of tenants or a role of the set of roles does not match any of the primary tenants or the primary roles, respectively, the user might not fit in to any of the primary user groups. As described herein, tenants identified in the assertion that do not match the set of primary tenants may be referred to as "secondary tenants." Roles identified in the assertion that do not match the set of primary tenants may be referred to as "secondary roles".

Based on determining that an attribute of the assertion does not map to the primary user groups, controller 20 creates a set of secondary user groups and a set of secondary user group names (622). Each secondary user group name of the set of secondary user group names may be associated with a respective secondary user group. Controller 20 provisions the set of secondary user groups in applications 30 (624). For example, controller 20 may be configured to create and provision a secondary user group corresponding to each unique combination of a secondary tenant and a primary role. In this manner, secondary user groups may exist in which to place users associated with secondary tenants, the secondary tenants being associated with at least one primary role. Additionally, controller 20 may create and provision a secondary user group corresponding to each unique combination of a secondary tenant and a secondary role and create and provision a secondary user group corresponding to each unique combination of a secondary role and a primary tenant. As such, after creating and provisioning the set of secondary user groups, applications 30 may be configured to map each attribute of the assertion to at least one of a primary user group or a secondary user group.

Controller 20 may create a list including the set of secondary user groups and the set of secondary user group names (626). The list may include respective pairs of tenants and roles associated with each secondary user group. Additionally, the list may indicate the secondary user group name corresponding to each secondary user group. Controller 20 may write the list into the assertion (628). Since the assertion may be written in a human-readable format, to write the list into the assertion, controller 20 may write each secondary user group including its respective pair of a primary or secondary tenant with a primary or secondary role into the assertion such that the list is readable by a human or by a computer. Subsequently, controller 20 sends the assertion (630) to application 30A. Subsequently, application 30A receives the assertion (632) and maps the set of attributes included in the assertion to respective primary user groups and secondary user groups (634).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Additionally, or alternatively, if implemented in software or firmware, the techniques may be realized at least in part by a computer-readable data storage medium including instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may include a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may include one or more computer-readable storage media.

In some examples, the computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A controller comprising processing circuitry coupled to a storage device, wherein the processing circuitry is configured to:
   create an assertion that includes information indicative of a set of attributes;
   determine if each attribute of the set of attributes maps to a plurality of primary user groups stored in the storage device;
   based on determining that an attribute of the set of attributes does not map to at least one primary user group of the plurality of primary user groups, create a set of secondary user groups and a set of secondary user group names corresponding to the attribute, wherein each secondary user group name of the set of secondary user group names corresponds to a respective secondary user group of the set of secondary user groups;
   write the set of secondary user groups and the set of secondary user group names into the assertion; and
   send the assertion to an application, enabling the application to map the set of attributes to respective primary user groups and secondary user groups.

2. The controller of claim 1, wherein prior to sending the assertion to the application, the processing circuitry is configured to provision the set of secondary user groups in the application.

3. The controller of claim 1, wherein the set of attributes comprises a set of tenants and a set of roles.

4. The controller of claim 3, wherein the set of tenants are subset of a plurality of tenants representing customers of a service provider network.

5. The controller of claim 3, wherein each primary user group of the plurality of primary user groups is associated with a primary tenant of a plurality of primary tenants and a primary role of a plurality of primary roles.

6. The controller of claim 5, wherein to determine if each attribute of the set of attributes maps to the plurality of primary user groups, the processing circuitry is configured to:
identify if each tenant of the set of tenants matches a primary tenant of the plurality of primary tenants;
identify if each role of the set of roles matches a primary role of the plurality of primary roles;
determine a set of secondary tenants, wherein the set of secondary tenants comprises each tenant of the set of tenants that does not match a primary tenant of the plurality of primary tenants; and
determine a set of secondary roles, wherein the set of secondary roles comprises each role of the set of roles that does not match a primary role of the plurality of primary roles.

7. The controller of claim 6, wherein to create the set of secondary user groups and the set of secondary user group names, the processing circuitry is configured to:
create a secondary user group corresponding to each unique combination of a secondary tenant and a primary role;
create a secondary user group corresponding to each unique combination of a secondary tenant and a secondary role;
create a secondary user group corresponding to each unique combination of a secondary role and a primary tenant; and
assign a secondary user group name to each secondary user group to create the set of secondary user group names.

8. The controller of claim 1, wherein prior to creating the assertion, the processing circuitry is further configured to:
receive, from the application, a request to obtain login information from a user interface based on an attempt to access the application by the user interface;
send, to the user interface, a request for login information;
receive the login information from the user interface, wherein the login information is associated with a user;
authenticate the user based on the login information; and
lookup the set of attributes in the storage device, wherein the set of attributes corresponds to the user.

9. The controller of claim 1, wherein prior to creating the assertion, the processing circuitry is further configured to:
receive login information from a user interface, wherein the login information is associated with a user;
authenticate the user based on the login information; and
lookup the set of attributes in the storage device, wherein the set of attributes corresponds to the user.

10. The controller of claim 1, wherein the assertion is a security assertion markup language (SAML) assertion.

11. A method comprising:
creating, by processing circuitry coupled to a storage device, an assertion that includes information indicative of a set of attributes;
determining, by the processing circuitry, if each attribute of the set of attributes maps to a plurality of primary user groups stored in the storage device;
based on determining that an attribute of the set of attributes does not map to at least one primary user group of the plurality of primary user groups, creating, by the processing circuitry, a set of secondary user groups and a set of secondary user group names corresponding to the attribute, wherein each secondary user group name of the set of secondary user group names corresponds to a respective secondary user group of the set of secondary user groups;
writing, by the processing circuitry, the set of secondary user groups and the set of secondary user group names into the assertion; and
sending, by the processing circuitry, the assertion to an application, enabling the application to map the set of attributes to respective primary user groups and secondary user groups.

12. The method of claim 11, wherein prior to sending the assertion to the application, the method further comprises provisioning, by the processing circuitry, the set of secondary user groups in the application.

13. The method of claim 11, wherein the set of attributes comprises a set of tenants and a set of roles.

14. The method of claim 13, wherein the set of tenants are subset of a plurality of tenants representing customers of a service provider network.

15. The method of claim 13, wherein each primary user group of the plurality of primary user groups is associated with a primary tenant of a plurality of primary tenants and a primary role of a plurality of primary roles.

16. The method of claim 15, wherein determining if each attribute of the set of attributes maps to the plurality of primary user groups comprises:
identifying if each tenant of the set of tenants matches a primary tenant of the plurality of primary tenants;
identifying if each role of the set of roles matches a primary role of the plurality of primary roles;
determining a set of secondary tenants, wherein the set of secondary tenants comprises each tenant of the set of tenants that does not match a primary tenant of the plurality of primary tenants; and
determining a set of secondary roles, wherein the set of secondary roles comprises each role of the set of roles that does not match a primary role of the plurality of primary roles.

17. The method of claim 16, wherein creating the set of secondary user groups and the set of secondary user group names comprises:
creating a secondary user group corresponding to each unique combination of a secondary tenant and a primary role;
creating a secondary user group corresponding to each unique combination of a secondary tenant and a secondary role;
creating a secondary user group corresponding to each unique combination of a secondary role and a primary tenant; and
assigning a secondary user group name to each secondary user group to create the set of secondary user group names.

18. The method of claim 11, wherein prior to creating the assertion, the method further comprises:
receiving, by the processing circuitry from the application, a request to obtain login information from a user interface based on an attempt to access the application by the user interface;
sending, by the processing circuitry to the user interface, a request for login information;

receiving, by the processing circuitry, the login information from the user interface, wherein the login information is associated with a user;

authenticating, by the processing circuitry, the user based on the login information; and looking up, by the processing circuitry, the set of attributes in the storage device, wherein the set of attributes corresponds to the user.

19. The method of claim 11, wherein the assertion is a security assertion markup language (SAML) assertion.

20. A non-transitory computer-readable medium comprising instructions for causing one or more programmable processors of a controller to:

create an assertion that includes information indicative of a set of attributes;

determine if each attribute of the set of attributes maps to a plurality of primary user groups stored in a storage device;

based on determining that an attribute of the set of attributes does not map to at least one primary user group of the plurality of primary user groups, create a set of secondary user groups and a set of secondary user group names corresponding to the attribute, wherein each secondary user group name of the set of secondary user group names corresponds to a respective secondary user group of the set of secondary user groups;

write the set of secondary user groups and the set of secondary user group names into the assertion; and send the assertion to an application, enabling the application to map the set of attributes to respective primary user groups and secondary user groups.

\* \* \* \* \*